Patented July 20, 1954

2,684,365

UNITED STATES PATENT OFFICE 2,684,365

METHOD OF CONVERTING TOMATIDINE INTO $\Delta^{16}$-ALLOPREGNENOLONE

Erich Mosettig, Washington, D. C., Yoshio Sato, Takoma Park, Md., and Alfred Katz, Basel, Switzerland No Drawing. Application February 7, 1952, Serial No. 270,904

4 Claims. (Cl. 260—239.55)

(Granted under Title 35, U. S. Code (1952), sec. 266)

The invention described herein may be manufactured and used by or for the Government of the United States for governmental purposes only without payment of any royalty thereon.

The present invention discloses the degradation of tomatidine, the aglycone of tomatine, to $\Delta^{16}$-allopregnen-3($\beta$)-ol-20-one. The degradation described herein is unexpected and unprecedented in the field of steroidal alkaloids, and was not predictable. Tomatine is a nitrogen-containing glycoside which is readily extractable from various tomato plants and leaves. Tomatidine has been described by Fontaine, Irving, Ma, Poole and Doolittle, at Arch. Biochem., 18, 467 (1948); Kuhn and Löw, Chem. Ber. 81, 552 (1948); and Kuhn, Löw and Gauhe, ibid, 83, 448 (1950). The method of the invention provides a convenient, cheap, and abundant source of homogeneous steroidal material for transformation to progesterone, sex hormones and other pharmaceutical agents.

In brief, by the present invention, tomatidine, regarded as having the empirical formula

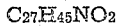

though no complete structural formula has as yet been established for it, is first acylated as by converting it to an acetylated crystalline product $C_{33}H_{51}O_5N$ by heating with acetic anhydride. The acylated derivative, by chromic acid oxidation and subsequent hydrolysis is then converted to $\Delta^{16}$-allopregnen-3($\beta$)-ol-20-one. This compound and its acetyl product have been identified and characterized by direct comparison with authentic samples, as regards melting points, mixture melting points, infrared spectra, and optical rotations.

For a further understanding of the invention reference may be had to a partial publication thereof within the year next preceding the filing of the present application for patent, appearing at Journal of the American Chemical Society 73, 880 (February 1951), and to the following specific example of a preferred embodiment which, of course, is to be considered illustrative and not restrictive of the invention.

Example 1.—Tomatidine (0.616 g.) and acetic anhydride (12 cc.) are heated under reflux for about two hours at 160–165° C. (oil bath temperature). The acetic anhydride is then removed by evaporation in vacuo (on aspirator at approximately 80°–100° C.). The oily residue is dissolved in ethanol, and water is added until incipient turbidity. The new compound

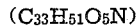

which precipitates is recrystallized from dilute methanol. This compound, not described prior to this invention, melts at 105–107° C. $[\alpha]_D^{20}$ —11.6° ($\pm 1°$), ($CHCl_3$, C=1.25). The yields vary from 60–80%.

To a solution of 1.085 g. of the above compound ($C_{32}H_{51}O_5N$) in 30 cc. of glacial acetic acid as solvent is added dropwise with stirring 0.900 g. of chromic anhydride in 15 cc. of 80% acetic acid, this quantity of chromic acid providing an ample excess of oxygen to rupture the double bond. During the addition the solution is cooled in icewater. After standing for about 2 hours at room temperature (20–23° C.) to insure completion of the oxidation process, the dark brown solution is poured into ice-water and extracted with ether. The use of ice-water keeps the temperature low and renders the reaction products less soluble in the non-ethereal phase. The ethereal extract is washed by shaking the same with water and discarding the water; then shaking the extract with sodium carbonate and water, which removes acidic products from the ethereal extracts; dried over anhydrous sodium sulfate; and the ether removed by evaporation. The oily residue is dissolved in 2% ethanolic-potassium hydroxide (i. e. 2% by weight of KOH in ethanol) and refluxed on the steambath for about 30 minutes during which time hydrolysis is effected. The reaction mixture is poured into ice-water and the flocculent precipitate is extracted with ether. After removal of the ether, the semi-crystalline product obtained in about 60% yield is crystallized from dilute methanol. By recrystallization from the same solvent $\Delta^{16}$-allopregnen-3($\beta$)-ol-20-one of M. P. 207–208° C. is obtained. The acetyl derivative (prepared by refluxing gently in acetic anhydride) melts at 166–168° C. (from methanol diluted with water to incipient turbidity). The identity was established by direct comparison (mixed melting point, infrared spectra and optical rotations) with authentic samples of $\Delta^{16}$-allopregnen-3($\beta$)-ol-20-one and its 3-acetyl derivative.

In connection with the foregoing example it is to be noted that the formation of the $C_{33}H_{51}O_5N$ does not involve a mere acetylation. In accordance with its empirical formula this compound is a tri-acetylated isomeric form of tomatidine. There are only two acetylable groups in the original tomatidine (the 3—OH and the —NH groups). During refluxing with acetic anhydride a third acetylable group is formed together with an ethylenic bond. At this site the oxidation to the 20-one group takes place.

The $\Delta^{16}$-allopregnen-3($\beta$)-ol-20-one as provided by the present invention may be converted into synthetic hormones, as by the processes described in U. S. Patent No. 2,335,616 issued November 6, 1941, to Tendrick and Lawson, and by Rosenkranz et al., J. A. C. S. 72, 4077 (1950).

As above noted, while the empirical formula $C_{27}H_{45}NO_2$ seems clearly established for tomatidine, no complete structural formula has yet been established for this substance. The partial structural formula of the steroidal moiety appears to be:

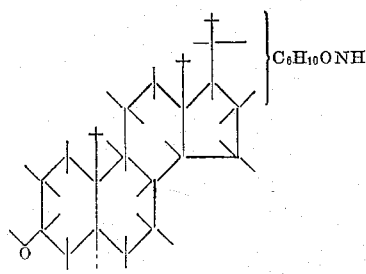

and this moiety appears to remain unaltered in the tri-acylated derivative, e. g. the unsaturated tri-acetyl derivative $C_{33}H_{51}NO_5$.

The structural formula of the corresponding moiety of $\Delta^{16}$-allopregnen-3($\beta$)-ol-20-one according to Klyne and Marrian, Biochem. J. 43 231 (1948) and Marker et al. J. Am. Chem. Soc., 63, 774 (1941), appears to be:

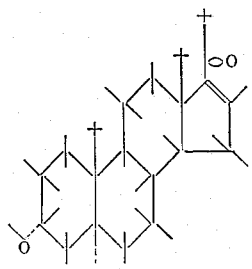

in which the alkyl ketone group in position 17 is converted into an oxygen or hydroxyl group when the allopregnenolone is converted into a sex hormone, for example.

From the above description it will be apparent that the invention is not limited to the particular details set forth in the above examples. For instance, propionic, butyric and phthalic anhydrides may be employed in lieu of acetic anhydride for the initial refluxing without change in the final hormone product. Similarly, any aliphatic alcohol that is miscible with water may be used in place of ethanol for dissolving the oily residue from the initial refluxing step. Likewise, while the oxidation with chromic anhydride is highly convenient, this step can be effected by use of permanganates, ozone, hydrogen peroxide in acetic acid, and like oxidizing agents. And in lieu of the ethanolic-potassium hydroxide, other hydrolytic reagents may be employed, for example, any carbonate or bicarbonate soluble in aqueous-alcoholic solutions, any alcoholate of the alkalies, any alkali hydroxides, and finally organic bases, such as pyridines, quinolines, tertiary and quaternary ammonia and ammonium compounds.

As the employment of the foregoing and other equivalent steps within the broader aspects of the invention will be obvious to those skilled in the art from the disclosure herein set forth, it is to be understood that the recitation of the foregoing equivalencies is illustrative and not restrictive, and that all modifications that come within the meaning and range of equivalency of the appended claims are intended to be included therein.

We claim as our invention:

1. The method of preparing $\Delta^{16}$-allopregnen-3($\beta$)-ol-20-one comprising heating tomatidine with an aliphatic acid anhydride selected from the group consisting of acetic anhydride, propionic anhydride, butyric anhydride, and phthalic anhydride under reflux conditions for a period of about two hours to effect a tri-acylation of tomatidine, oxidizing the resulting triacylated derivative while in solution with an oxidizing agent selected from the group consisting of chromic acid, permanganates, ozone, and hydrogen peroxide-acetic acid solution for about two hours at room temperature to effect the rupture of the ethylenic bond formed by the acylation of the tomatidine, and hydrolyzing the oxidized product in solution with a hydrolyzing agent selected from the group consisting of carbonates soluble in aqueous alcoholic solution, bicarbonates soluble in aqueous alcoholic solutions, an alcoholate of an alkali, alkali hydroxides, pyridines, and quinolines under reflux conditions for about thirty minutes to form $\Delta^{16}$-allopregnen-3($\beta$)-ol-20-one, and recovering the $\Delta^{16}$-allopregnen-3($\beta$)-ol-20-one.

2. The method of forming an intermediary reaction product from tomatidine suitable for use in preparing $\Delta^{16}$-allopregnen-3($\beta$)-ol-20-one comprising heating tomatidine with an aliphatic acid anhydride selected from the group consisting of acetic anhydride, propionic anhydride, butyric anhydride, and phthalic anhydride under reflux conditions and for a period of time of about two hours to effect a tri-acylation of tomatidine, and recovering the formed reaction product.

3. A tri-acylated derivative of the steroidal alkaloid tomatidine having the empirical formula $C_{33}H_{51}O_5N$ and having a melting point of 105–107° C. and prepared by heating tomatidine with an aliphatic acid anhydride selected from the group consisting of acetic anhydride, propionic anhydride, butyric anhydride, and phthalic under reflux conditions and for a period of time of about two hours to effect a tri-acylation of tomatidine, and recovering the formed product.

4. The method of preparing the $\Delta^{16}$-allopregnen-3($\beta$)-ol-20-one comprising heating tomatidine with acetic anhydride under reflux conditions for about two hours at about 160–165° C., oxidizing the resulting product with chromic anhydride in a cooling state and permitting it to stand for about 2 hours at about room temperature, hydrolyzing the resulting oxidized product with an ethanolic-potassium hydroxide solution under reflux conditions for about 30 minutes, and recovering $\Delta^{16}$-allopregnen-3($\beta$)-ol-20-one.

References Cited in the file of this patent

Berichte, August 1950, vol. 83, pp. 448–452.
Federation Proceedings, March 1950, pp. 171 and 172.